Oct. 13, 1931.  E. H. WARING  1,827,409
SHAFT BEARING
Filed July 9, 1925   2 Sheets-Sheet 1

Inventor,
Edward H. Waring,
By Samuel W. Balch
Attorney.

Oct. 13, 1931.  E. H. WARING  1,827,409
SHAFT BEARING
Filed July 9, 1925   2 Sheets-Sheet 2

Inventor,
Edward H. Waring
By Samuel W. Balch
Attorney.

Patented Oct. 13, 1931

1,827,409

UNITED STATES PATENT OFFICE

EDWARD H. WARING, OF ESSEX FELLS, NEW JERSEY, ASSIGNOR TO CROCKER-WHEELER ELECTRIC MANUFACTURING COMPANY, OF AMPERE, NEW JERSEY, A CORPORATION OF NEW JERSEY

SHAFT BEARING

Application filed July 9, 1925. Serial No. 42,385.

This invention relates particularly to a suitable housing or enclosure for the bearings of electric motors, but it is not restricted to bearings for this particular use. Objects of the invention are to provide an ample oil-reservoir and insure an adequate supply of oil therefrom to the bearing surfaces, to prevent oil from being discharged from the enclosure and wasted and to prevent the entrance of dust. Other objects are to provide a bearing, which while retaining these advantages, may be placed in any position, as with the axis of the shaft either horizontal or vertical and either end up, and in which the position does not need to be taken into account in the construction or assembly of the bearing.

In the accompanying two sheets of drawings which form a part of this description, Figure 1 is a vertical section through a bearing and housing which embodies this invention, the shaft being shown in a horizontal position, and the section through one of the caps of the housing being on the line I—I of Fig. 2.

Figure 1:
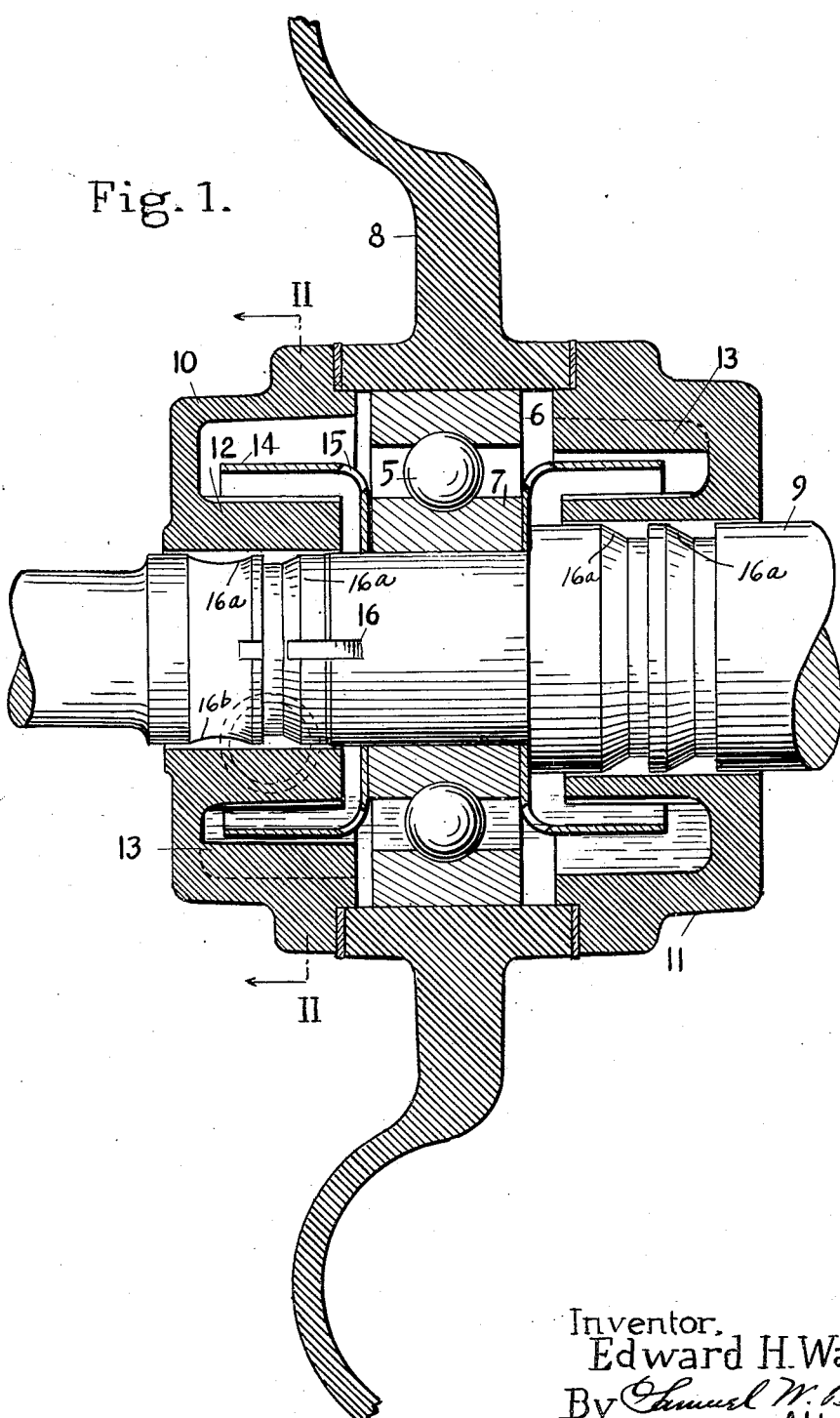
Figure 2:
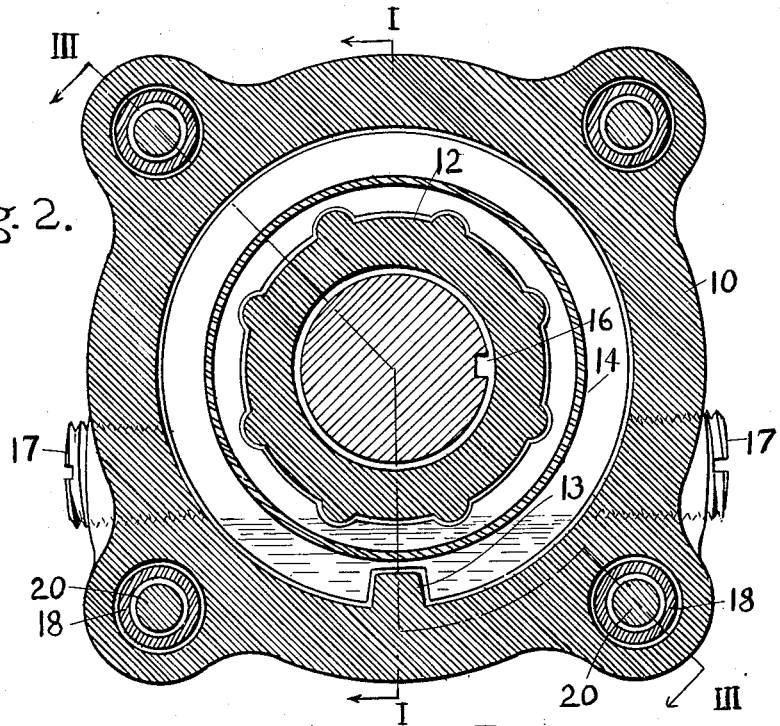
Fig. 2 is a transverse section through the outer cap on the line II—II of Figs. 1 and 3.
Figure 3:
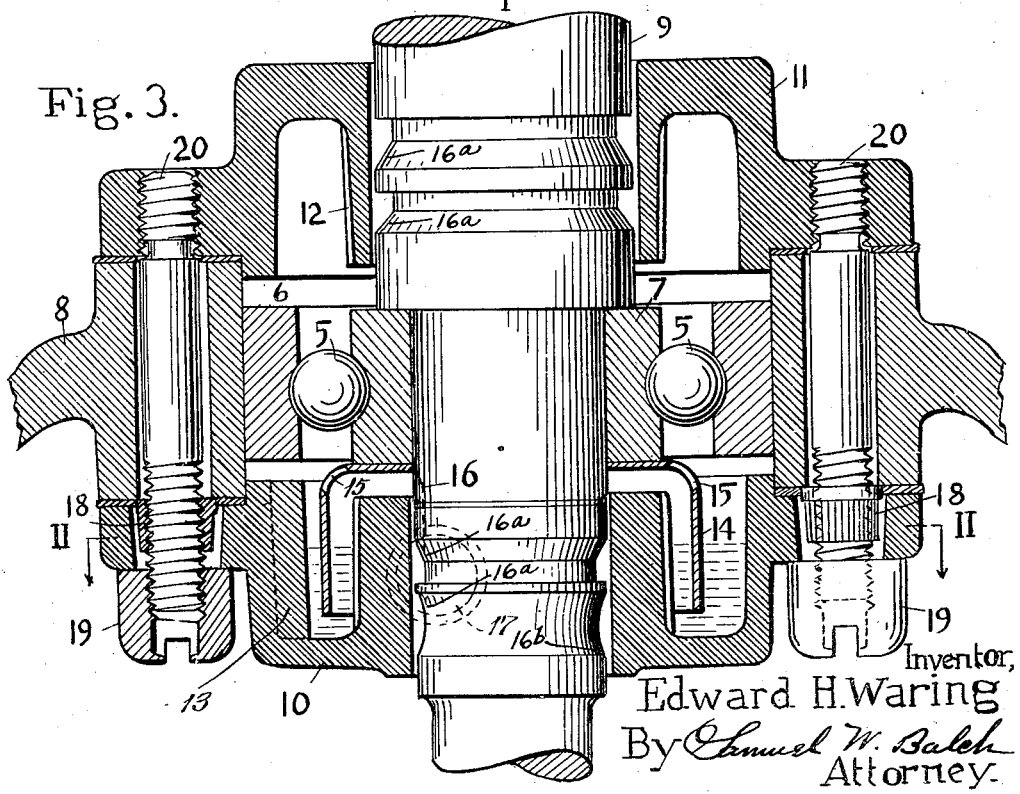
Fig. 3 is a vertical section through the axis of the bearing and housing, the shaft being shown in a vertical position, and the section through one of the caps being on the line III—III of Fig. 2.

The invention is shown in connection with a ball bearing in which balls 5, 5 run between an outer race member 6 and an inner race member 7. The outer race member is a sliding fit in the end frame 8 of a motor and the inner race member is a tight fit on the shaft 9 of the motor. This type of bearing is not essential to this invention, nor is it essential that the bearing should be of an anti-friction type. The proportions shown are suitable for a one inch shaft at the large part.

At one end of the bearing is an outer cap 10 and at the other end of the bearing is an inner cap 11, each with an oil space concentric with the shaft. The space also is annular. The caps are designed for die casting. They form part of the bearing housing. A hub 12 projects inwardly so that the cap can be used to hold the lubricant without its running out through the hole in the hub when the shaft is vertical. On the inner side of the outer wall of the cap is a deflecting rib 13. A light grease is usually the preferable kind of lubricant, but since oil is sometimes necessary both will be here referred to as oil.

An oil-sling 14 is carried by the shaft, dips into the annular oil-space and revolves within about one sixty-fourth of an inch of the deflecting rib. This oil-sling is conveniently the rim of a cup with a central hole through which the shaft passes and fits tight, but a continuous rim is not essential. As this dips into the oil and revolves rapidly all of the oil within the cup is driven out by centrifugal force and the oil outside in contact with the revolving oil-sling is carried around and thrown against the deflecting rib and thereby deflected and injected into the bearing. This is particularly necessary in case the shaft is in a vertical position and a grease is used which will then be accumulated against the rib and will pile up against the bearing. In the bottom of the cup are holes 15, 15 which are direct communicating passageways between the interior of the cup and the bearing space. They afford a passage for deflected lubricant to reach the shaft and seal the housing, particularly when the shaft is vertical. Also the holes prevent the retension of grease in the cup if the rim is directed upward in the case of slow moving motors.

The hubs of the caps are not normally bearings for the shaft, but their bores should come as close to the shaft as is conveniently possible, and should be circumferentially unbroken. The bores are therefore about ten to twenty thousandth of an inch larger than the shaft where it passes through so as to leave a clearance all around of from five to ten thousandths of an inch. The shaft is grooved to prevent creepage of oil thereon and the grooves are sloping or beveled at 16a on the sides toward the bearing for this purpose. The oil lodges and maintains capillary films between the shaft and the bore particularly at the outer edges of the bevels. There is usually a slight difference of pressure between the inside and the outside of the motor which is produced by fans attached to the rotor of the motor and the capillary seals hold against this difference in pressure and prevent any continuous passage of air through the bearing which would bring in dust. With each starting up of the motor there is a warming of air in the bearing space, and to prevent this from building up a pressure which might break the capillary seals and expel a slight amount of oil at each starting up, an air-vent 16 is provided in the form of a groove under the capillary seals in the outer cap through which a slight amount of air can flow out from the bearing space and prevent any pressure difference. Air inflow occurs only when the motor is stopped and the bearing is cooling, and as the centrifugal seals at the inner end of the bearing are not holding, the inflow is not confined to the air-vent. At the outer end of the bearing, in the shaft one of the grooves 16b has a bevel for an additional seal on the side away from the bearing so that any liquid which might be splashed on the machine would itself seal the bearing at this bevel against further entrance.

Oil is introduced by removing one or the other of two plugs 17, 17 in the outer bearing cap. The holes for these plugs are so positioned that the oil-space can not be filled above the permissible level shown when the shaft is in a horizontal position.

The inner cap is held in place by nuts 18, 18 and the outer cap is held in place by nuts 19, 19. Both sets of nuts are accessible from the outside and are on the same stud bolts 20, 20 which are carried by the inner cap. To introduce oil when the motor is vertical and it is not convenient to bring it to a horizontal position for the purpose, the nuts which hold the outer cap of the lower bearing may be removed and this cap dropped down on the shaft and filled. The outer cap of the upper bearing can also be removed for inspection of the bearing and oiling.

In the figure which shows the shaft in a vertical position no oil-sling is shown in connection with the inner and upper cap, but its presence is not objectionable although not necessary, and ordinarily there will be oil-slings on both sides of the bearing so that it may be used in any position.

I claim:

1. In a bearing, a shaft having a beveled shoulder inclined toward the bearing, a cap for the bearing with an opening therethrough for the shaft which is suitably spaced from the shaft opposite the shoulder to maintain a capillary seal, the shaft having an air-vent groove under the seal.

2. In a bearing, a shaft having a plurality of adjacent circumferential grooves, a housing for the bearing with an opening therethrough for the shaft which is suitably spaced from the shaft, one of the adjacent grooves having unsymmetrical sides, and each groove having one side inclined toward the bearing so as to more effectively maintain capillary seals in series between the bearing space and space exterior to the bearing to prevent the escape of lubricant, and the outermost groove having a side inclined away from the bearing to maintain a capillary seal to prevent the entrance of liquids.

3. In combination, a shaft, a ball-bearing for the shaft, a stationary housing for the bearing forming an oil-reservoir directly open to the underside of the bearing, an oil-sling carried by the shaft and dipping into the oil-reservoir, the oil-sling having as large a diameter at the bottom as at the top, and a deflecting rib on the circumferential wall of the oil-reservoir in close proximity to the oil-sling along a sufficient portion of its length, whereby the oil is forced in an axial direction along the rib by the kinetic energy imparted by the oil-sling, the parts being suitably shaped and located with respect to the bearing so as to be operative with the axis of the shaft in an approximately vertical direction.

4. In combination a shaft, a ball-bearing for the shaft, a stationary housing for the bearing forming an oil-reservoir directly open to the underside of the bearing, an oil-sling carried by the shaft and dipping into the part of the oil-reservoir most remote from the bearing in the direction of the axis of the shaft, the oil-sling having as large a diameter at the bottom as at the top, and an inwardly projecting deflecting rib on the wall of the oil-reservoir by which oil is forced in the direction of the axis into the bearing, the parts being suitably shaped and located with respect to the bearing so as to be operative with the axis of the shaft in an approximately vertical direction.

5. In a bearing, a shaft having a cylindrical section and a sloping section adjacent to the cylindrical section, the sloping section being materially inclined to the cylindrical section, and a housing for the bearing with an opening therethrough for the shaft which is closely spaced from the shaft and extends axially a material distance over both the cylindrical and the sloping sections of the shaft, so as to maintain a capillary seal between the bearing space and space exterior to the bearing.

6. In a bearing, a shaft having a cylindrical section and a sloping section adjacent to the cylindrical section, the sloping section being materially inclined to the cylindrical section, and a housing for the bearing with a wall which is impervious except for an opening therethrough for the shaft which is closely spaced from the shaft and extends axially a material distance over both the cylindrical and the sloping sections of the shaft, so as to maintain a capillary seal between the bearing space and space exterior to the bearing.

7. In a bearing, a shaft having a cylindrical section and a sloping section adjacent to the cylindrical section, the sloping section being materially inclined to the cylindrical section, and a housing for the bearing with a wall which is impervious above the level of the lubricant except for an opening therethrough for the shaft which is closely spaced from the shaft and extends axially a material distance over both the cylindrical and the sloping sections of the shaft, so as to maintain a capillary seal between the bearing space and space exterior to the bearing.

EDWARD H. WARING.